United States Patent
Lee et al.

(10) Patent No.: US 8,209,731 B2
(45) Date of Patent: Jun. 26, 2012

(54) TRANSMITTER AND RECEIVER OF VIDEO TRANSMISSION SYSTEM AND METHOD FOR CONTROLLING BUFFERS IN TRANSMITTER AND RECEIVER

(75) Inventors: Yun-gu Lee, Yongin-si (KR);
Byung-cheol Song, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 12/199,345

(22) Filed: Aug. 27, 2008

(65) Prior Publication Data
US 2009/0185625 A1    Jul. 23, 2009

(30) Foreign Application Priority Data

Jan. 17, 2008    (KR) .................. 10-2008-0005335

(51) Int. Cl.
*H04N 7/173* (2011.01)

(52) U.S. Cl. ........................................... 725/94; 725/93
(58) Field of Classification Search .................. None
See application file for complete search history.

(56) References Cited

U.S. PATENT DOCUMENTS

| | | | |
|---|---|---|---|
| 2002/0004840 A1* | 1/2002 | Harumoto et al. | 709/231 |
| 2003/0066094 A1* | 4/2003 | van der Schaar et al. | 725/151 |
| 2005/0138459 A1* | 6/2005 | Yoon et al. | 713/600 |
| 2007/0248170 A1* | 10/2007 | Baba et al. | 375/240.25 |

* cited by examiner

*Primary Examiner* — Brian Pendleton
*Assistant Examiner* — Cai Chen
(74) *Attorney, Agent, or Firm* — Sughrue Mion, PLLC (57) ABSTRACT

Provided is a method for controlling a buffer in a transmitter and a receiver of a video transmission system in an environment where a channel transfer rate varies. The method includes: if a channel transfer rate is changed, changing a capacity of a buffer in a transmitter being used in proportion to the c rate, the buffer temporarily storing and outputting the video data to a receiver, or changing the delay time of a buffer in the receiver by gradually changing an operating clock in the receiver.

5 Claims, 8 Drawing Sheets

TRANSMITTER AND RECEIVER OF VIDEO TRANSMISSION SYSTEM AND METHOD FOR CONTROLLING BUFFERS IN TRANSMITTER AND RECEIVER

CROSS-REFERENCE TO RELATED PATENT APPLICATION

This application claims priority from Korean Patent Application No. 10-2008-0005335, filed on Jan. 17, 2008, in the Korean Intellectual Property Office, the disclosure of which is incorporated herein in its entirety by reference.

BACKGROUND OF THE INVENTION

1. Field of the Invention

Apparatuses and method consistent with the present invention relate to controlling a buffer, and more particularly, to controlling buffers in a transmitter and a receiver of a video transmission system in an environment where a channel transfer rate varies.

2. Description of the Related Art

Real-time video transmission systems for transmitting video data in real time via the Internet or wireless networks have become popular in recent years.

Figure 1:
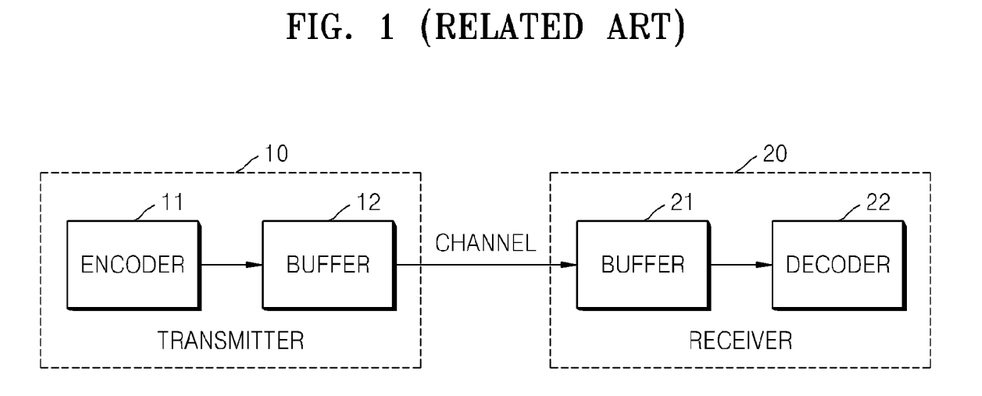
FIG. 1 is a block diagram of a conventional real-time video transmission system.

FIG. 1 is a block diagram of a conventional real-time video transmission system.

Referring to FIG. 1, the real-time video transmission system includes a transmitter 10 transmitting video data and a receiver 20 receiving video data via a wired/wireless channel. The transmitter 10 includes an encoder 11 encoding video data and outputting the resulting data and a buffer 12 temporarily storing the resulting video data generated by the encoder 11 and outputting the video data according to a channel transfer rate.

The receiver 20 includes a buffer 21 holding video data output from the buffer 12 in the transmitter 10 and outputting the video data and a decoder 22 decoding the video data output from the buffer 21. The buffer 21 in the receiver 20 holds the received video data for a predetermined period before output of the data. In this case, a time difference between a point at which video data is input to the buffer 21 and a point at which the input video data is output from the buffer 21 is defined as delay time. In general, the receiver 20 stores data in the buffer 21 for predetermined delay time before starting reproduction of the video data.

If the transmitter 10 sends more data than the receiver 20 can handle, the buffer 21 in the receiver 20 may overflow. Conversely, if the buffer 21 in the receiver 20 has less data than the receiver 20 can handle, it may underflow.

In order to prevent buffer overflows in the video transmission system of FIG. 1, if a channel transfer rate, a size of the buffer 21, and delay time of the buffer 21 are R (bps), $B_D$ (bits), and D (second), respectively, the buffer 21 needs to have a size $B_D$ greater than or equal to R×D (bits). When the channel transfer rate R is fixed, if the delay time D is set to $B_D/R$, the buffer 21 will neither overflow nor underflow.

When channel transfer rate R is changed to R', the delay time D must be reset to $B_D/R'$ to prevent buffer overflows or underflows. However, changing delay time abruptly shifts the timing of a video synchronization signal in video data, thereby resulting in freezing on the video reproduction.

SUMMARY OF THE INVENTION

The present invention provides a transmitter and a receiver in a video transmission system and a method for controlling a buffer that can prevent the buffer from overflowing or underflowing when a channel transfer rate varies According to an aspect of the present invention, there is provided a method for controlling a buffer in a video transmission system, including: determining whether a channel transfer rate is changed; and if the channel transfer rate is changed, changing a capacity of a buffer in a transmitter being used in proportion to the channel transfer rate, the buffer temporarily storing and outputting video data to a receiver.

According to another aspect of the present invention, the method may include: determining whether a channel transfer rate is changed; and changing, if the channel transfer rate is changed, delay time of a buffer in a receiver by gradually changing an operating clock in the receiver.

According to another aspect of the present invention, there is provided a transmitter in a video transmission system, including: an encoder generating video data; a buffer storing the video data generated by the encoder and outputting the video data to a receiver; and a buffer controller changing, if a channel transfer rate is changed, the capacity of the buffer being used in proportion to the channel transfer rate.

According to another aspect of the present invention, there is provided a receiver in a video transmission system, including: a decoder reproducing video data; a buffer storing the video data and outputting the video data to the decoder; and an operating clock controller changing, if a channel transfer rate is changed, delay time of the buffer by gradually changing an operating clock in the buffer.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2:
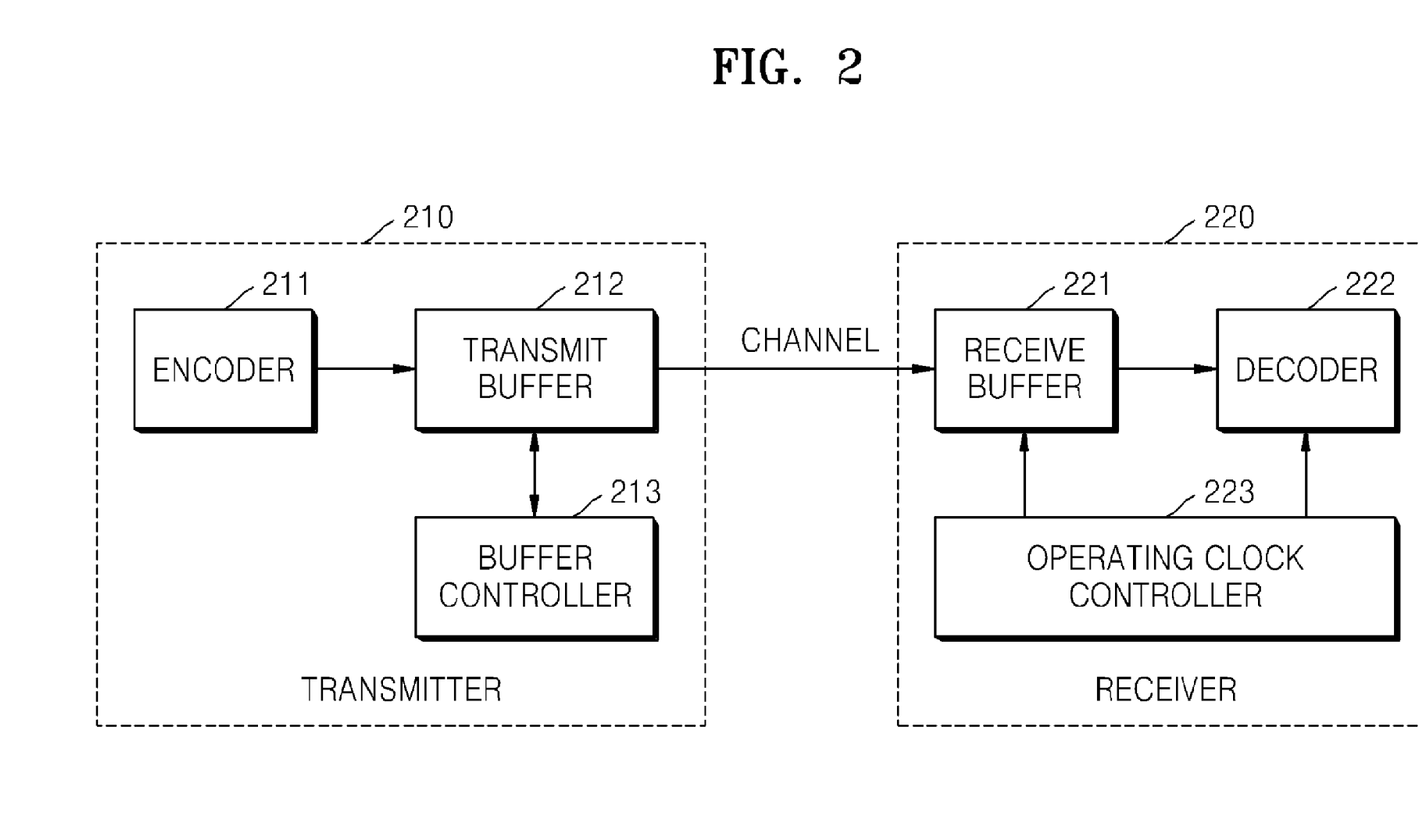
FIG. 2 is a block diagram illustrating the configuration of a video transmission system according to an exemplary embodiment of the present invention.

FIG. 2 is a block diagram illustrating the configuration of a video transmission system according to an exemplary embodiment of the present invention.

Referring to FIG. 2, the video transmission system according to an exemplary embodiment includes a transmitter 210 sending video data in real time and a receiver 220 receiving real-time video data.

The transmitter 210 includes an encoder 211, a transmit buffer 212, and a buffer controller 213. The receiver 220 includes a receive buffer 221, a decoder 222, and an operating clock controller 223.

The encoder 211 generates video data and outputs the video data to the transmit buffer 212. The transmit buffer 212 then receives the video data at a predetermined rate according to a channel transfer rate. When the channel transfer rate is changed, the buffer controller 213 changes the capacity of the transmit buffer 212 being actually used in proportion to the channel transfer rate. According to an exemplary embodiment of the present invention, overflow of the receive buffer 221 can be prevented by adjusting the capacity of the transmit buffer 212 being actually used in this way while constantly maintaining the delay time of the receive buffer 221.

Figure 3:
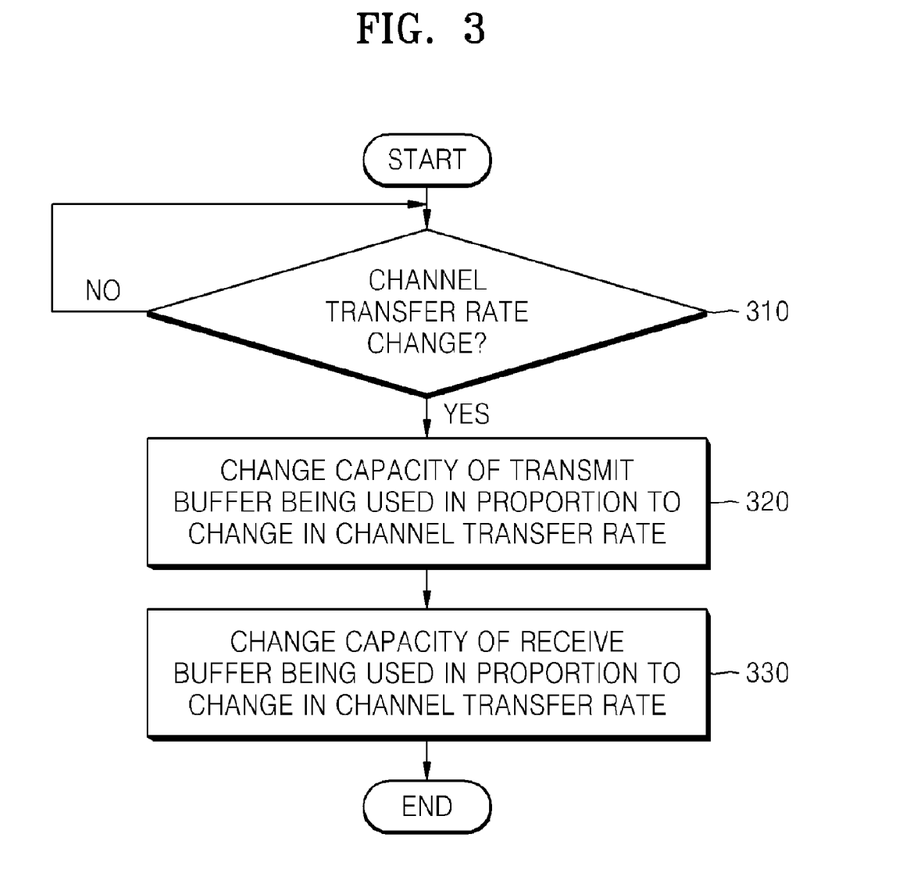
FIG. 3 is a flowchart illustrating a method for controlling a buffer in a video transmission system according to an exemplary embodiment of the present invention.

FIG. 3 is a flowchart illustrating a method for controlling a buffer in a video transmission system according to an exemplary embodiment of the present invention. A method for controlling the transmit buffer 212 in the transmitter 210 of the video transmission system is described in detail with reference to FIGS. 2 and 3.

In operation 310, the buffer controller 213 determines whether a channel transfer rate is changed. If the channel transfer rate is changed, the buffer controller 213 changes the storage capacity of the transmit buffer 212 being actually used in proportion to the channel transfer rate in operation 320. The buffer controller 213 determines the storage capacity $B_E(R)$ of the transmit buffer 212 being used according to the current channel transfer rate Rcur, as defined in Equation (1):

$$B_E(R) = B_N * (Rcur/Rmax) \quad (1)$$

where Rcur (bps), Rmax, Rmin, and $B_N$ (bits) respectively denote the current channel transfer rate, the maximum channel transfer rate, the minimum channel transfer rate, and the total available size of the transmit buffer 212.

Figure 4:
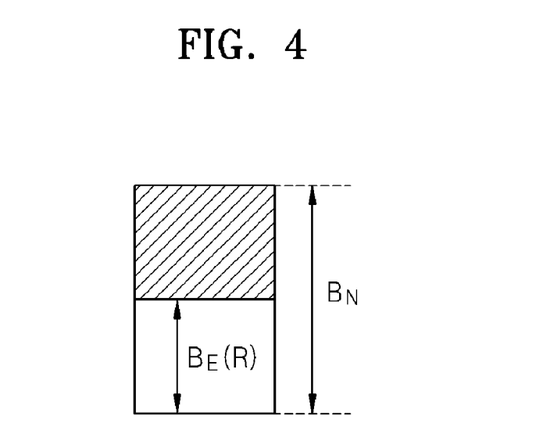
FIG. 4 is a diagram for explaining the relationship between the total data storage capacity $B_N$ available on the transmit buffer in FIG. 2 and the storage capacity of the transmit buffer being actually used for video transmission.

Referring to FIG. 4, the storage capacity $B_E(R)$ of the transmit buffer 212 refers to the data storage capacity of the transmit buffer 212 being actually used for video transmission when the total data storage capacity available on the transmit buffer 212 is $B_N$. According to the present embodiment, if the channel transfer rate is changed, overflow of the receive buffer 221 can be prevented without changing the delay time D of the receive buffer 221. That is, given the fact that the delay time D of the receive buffer 221 is determined using the storage capacity $B_E(R)$ of the transmit buffer 212 being used and the channel transfer rate R as defined in Equation (2) below, it is kept constant throughout a change in channel transfer rate R by adjusting the storage capacity $B_E(R)$ proportionally to the changed channel transfer rate.

$$D = \frac{B_E(R)}{R} \quad (2)$$

As shown in Equation (2), the delay time D of the receive buffer 221 is kept constant by increasing or decreasing the storage capacity $B_E(R)$ of the transmit buffer 212 being used as the channel transfer rate R becomes higher or lower. While the size $B_D$ of the receive buffer 221 is theoretically equal to the size $B_N$ of the transmit buffer 212 in order to prevent overflow of the receive buffer 221, the size $B_D$ of the receive buffer 221 may be actually greater than $B_N$. The delay time D of the receive buffer 221 may also be greater than $B_N$/Rmax because Rmin<Rmax so $B_N$/Rmin>$B_N$/Rmax. That is, the delay time D may be greater than $B_N$/Rmax but less than $B_N$/Rmin.

In operation 330, the storage capacity of the receive buffer 221 being used may be adjusted according to a change in the storage capacity $B_E(R)$ of the transmit buffer 212 being used in order to prevent underflow of the receive buffer 221 if the storage capacity $B_E(R)$ of the transmit buffer 212 is reduced.

According to an exemplary embodiment, since the delay time D of the receive buffer 221 is fixed so that the timing of a video synchronization remains constant, seamless reproduction is possible despite allowing a change in channel transfer rate R.

Figure 5:
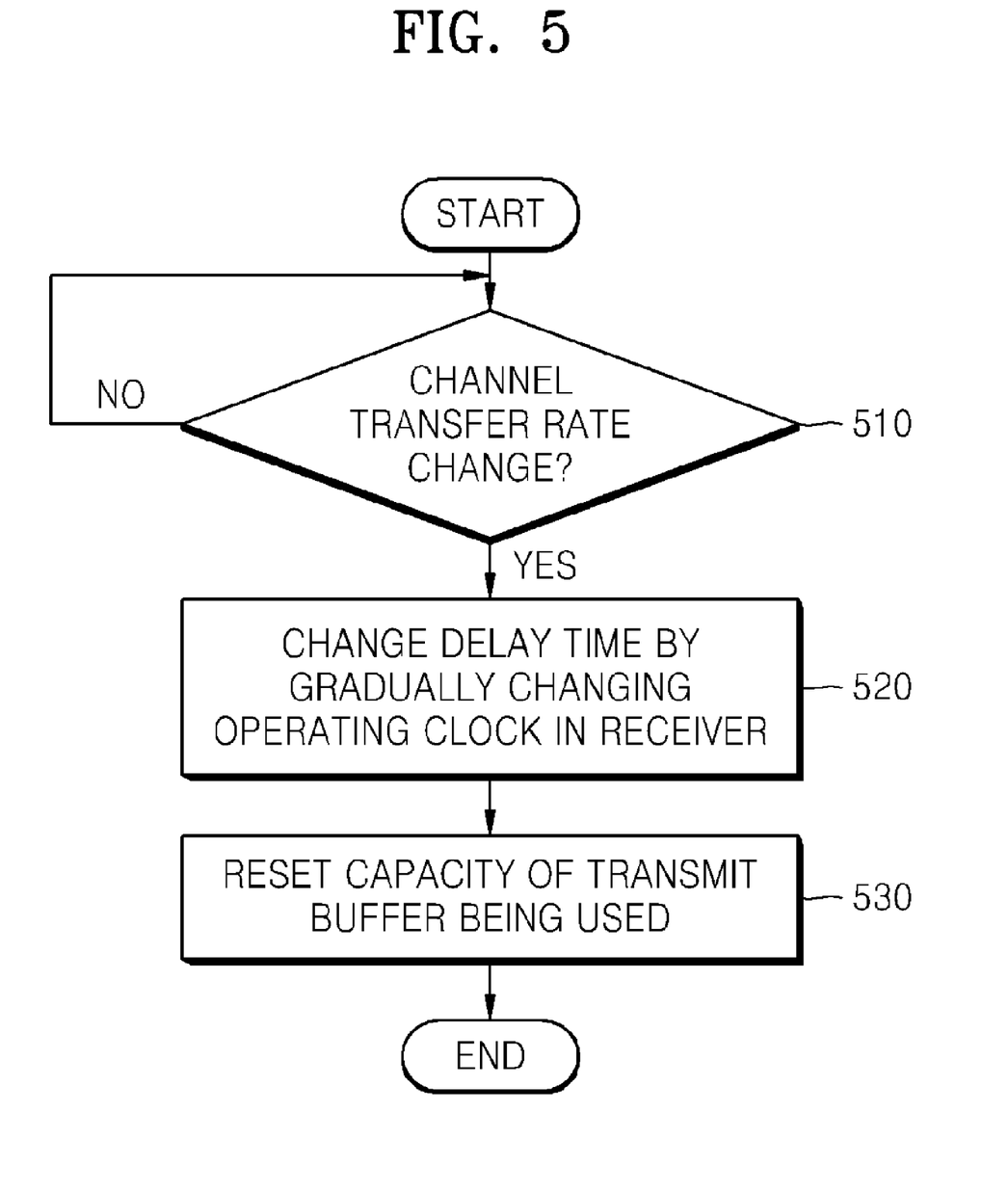
FIG. 5 is a flowchart illustrating a method for controlling a buffer in a video transmission system according to another exemplary embodiment of the present invention.

FIG. 5 is a flowchart illustrating a method for controlling a buffer in a video transmission system according to another exemplary embodiment of the present invention.

The method for controlling a buffer in a video transmission system according to an exemplary embodiment includes changing the delay time of the receive buffer 221 by gradually altering an operating clock in the receive buffer 221, thereby preventing freezing of the reproduction of video due to an abrupt change in delay time Referring to FIGS. 2 and 5, in operation 510, an operating clock controller 223 monitors a change in a channel transfer rate. If the channel transfer rate is changed, the operating clock controller 223 gradually alters the operating clock in the receiver 220 in order to change the delay time of the receive buffer 221 in operation 520. Changing the delay time of the receiver 221 can prevent buffer overflows or underflows while making full use of the given buffer capacity.

More specifically, if the channel transfer rate is increased, the operating clock controller 223 computes an optimal delay time of the receive buffer 221 for preventing overflow and underflow at the changed channel transfer rate, as well as a target operating clock for obtaining the optimal delay time. The operating clock controller 223 also gradually changes a current operating clock to the computed optimal operating clock. The delay time that is a difference between a point at which video data is input to the receive buffer 221 and a point at which the input video data is output from the receive buffer 221 gradually changes with the gradual change in the operating clock. In operation 530, the capacity of the transmit buffer 212 being used is reset.

Figure 6:
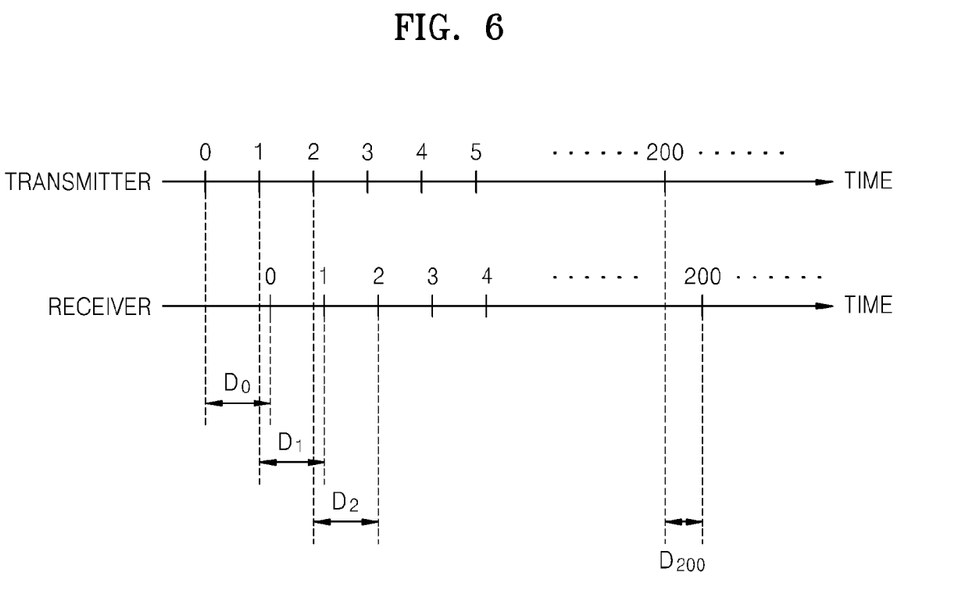
FIG. 6 illustrates an example of a change in the delay time of a receive buffer according to an exemplary embodiment of the present invention.

FIG. 6 illustrates an example of a change in the delay time of a receive buffer according to an embodiment of the present invention.

In FIG. 6, the abscissa denotes time. Numbers "1" through "200" shown at a transmitter side respectively denote time at which an n-th picture is transmitted by a transmitter and input into a receive buffer in a receiver. Numbers "1" through "200" shown at a receiver side respectively indicate time at which an n-th picture stored in the receive buffer is output from the receive buffer. That is, in FIG. 6, Dn indicates the delay time for an n-th picture that is the difference between a point at which video data is input to the receive buffer and a point at which the input video data is output from the receive buffer.

Referring to FIG. 6, assuming that a channel transfer rate changes from Rcur to Rcur' after a first picture is input, it is desirable to change the delay time of a receive buffer suitably for the changed channel transfer rate Rcur' in order to make full use of the storage capacity of the transmit buffer and receive buffer, rather than changing the storage capacity of the transmit buffer being used as described in the previous embodiment. However, if the delay time of the receive buffer is abruptly changed, a video image may freeze due to a shift in the timing of a video synchronization signal as described above. Thus, the operating clock controller 223 gradually alters the operating clock to change to eventually change the delay time of the receive buffer 221 operating in synchronization with the operating clock. If the delay time of the receive buffer should be changed from $D_0$ to $D_{200}$ due to a change in channel transfer rate as shown in FIG. 6, the operating clock controller 223 calculates a target operating clock for generating the delay time $D_{200}$ and gradually changes the current operating clock to the target operating clock.

The operating clock controller 223 can be implemented as a clock recovery circuit that compensates for a time difference between transmitter and receiver due to a clock jitter that may occur within a typical video transmission system. Alternatively, the operating clock controller 223 may be separate from a typical clock recovery circuit so as to gradually change the operating clock of the receiver 220.

Figure 7A:
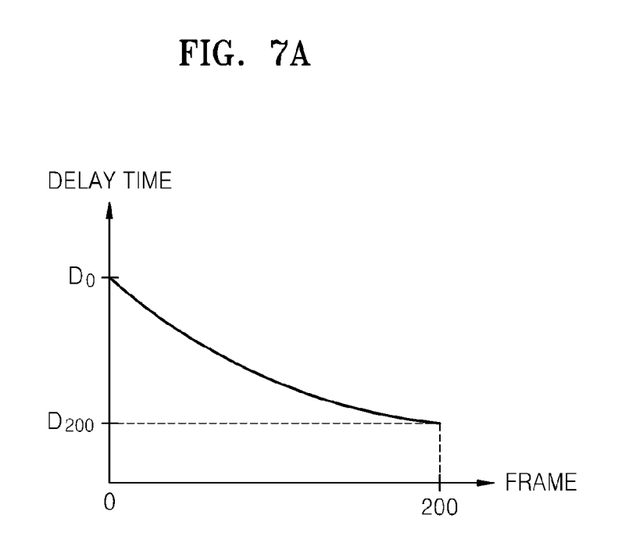
FIGS. 7A through 7C illustrate examples of gradual changes in the delay time of a receive buffer according to another exemplary embodiment of the present invention.
Figure 7B:
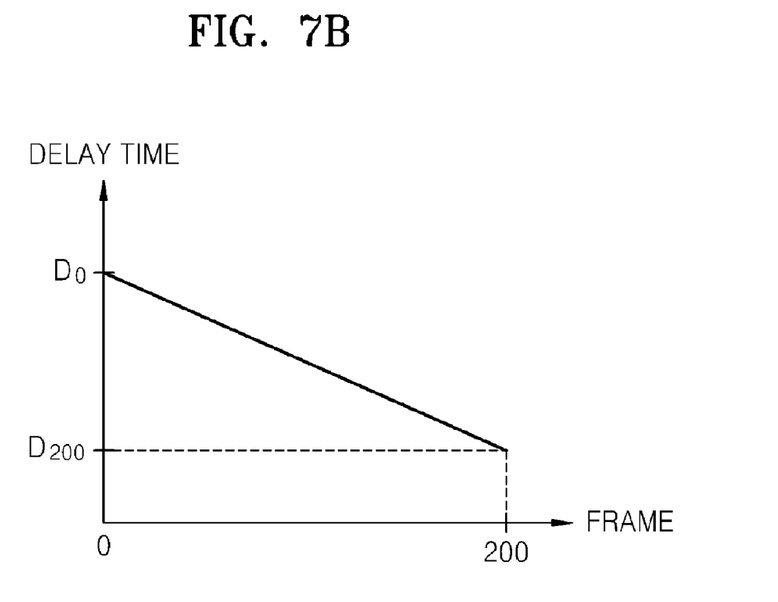
Figure 7C:
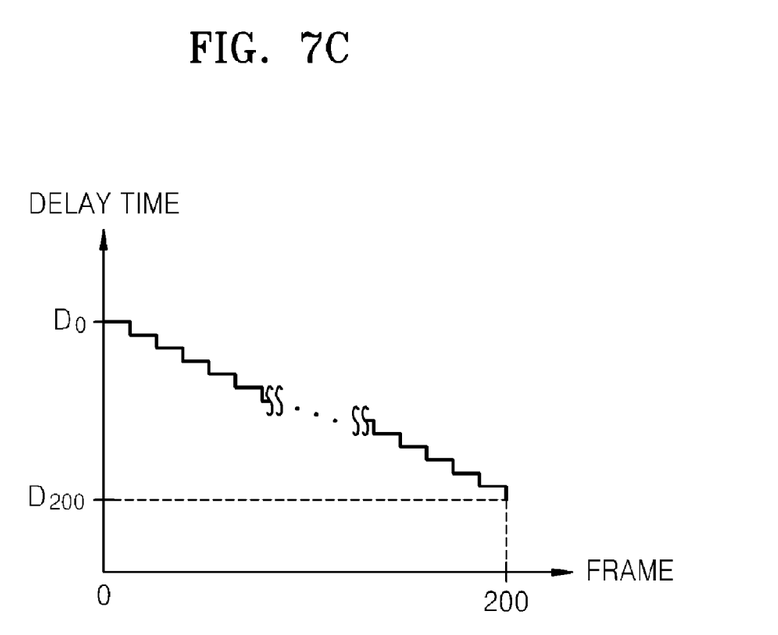
Figure 8A:
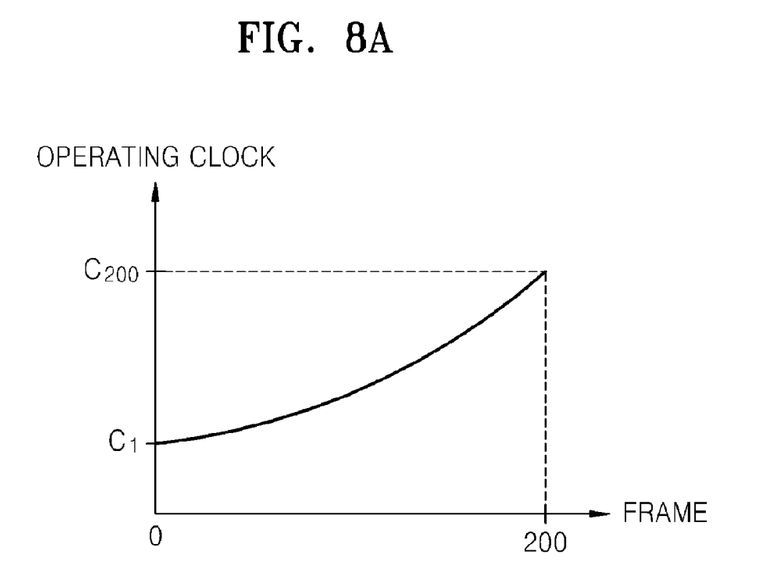
FIGS. 8A through 8C illustrate examples of an operating clock for realizing the gradual changes in the delay time of the receive buffer shown in FIGS. 7A through 7C.
Figure 8B:
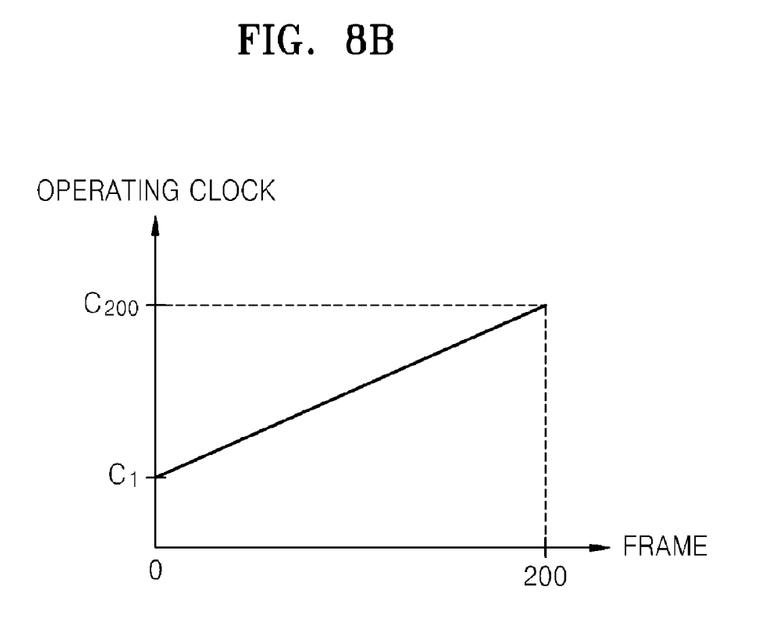
Figure 8C:
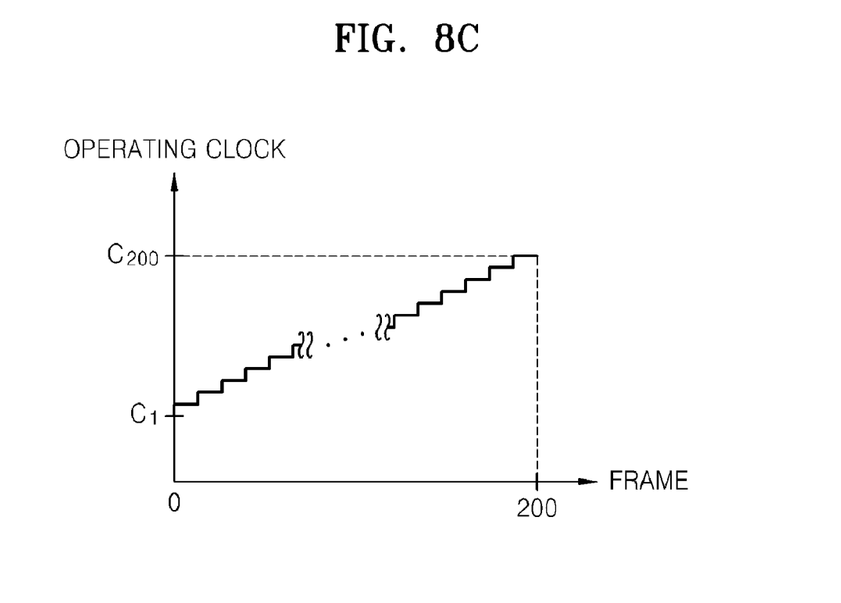

FIGS. 7A through 7C illustrate examples of gradual changes in the delay time of a receive buffer according to another exemplary embodiment of the present invention. FIGS. 8A through 8C illustrate examples of an operating clock for realizing the gradual changes in the delay time of the receive buffer shown in FIGS. 7A through 7C.

Referring to FIGS. 7A through 7C, If a channel transfer rate is changed and the current delay time $D_0$ of a receive buffer should be reduced to the delay time $D_{200}$, then it is suitable to change the delay time gradually in a non-linear fashion (FIG. 7A), in a linear fashion (FIG. 7B), or in a stepwise fashion (FIG. 7C). For a gradual change in the delay time of the receive buffer 221, the operating clock controller 223 gradually changes an operating clock in a manner that is inversely proportional to a change in the delay time.

Returning to FIG. 5, in operation 530, the operating clock controller 223 changes the capacity of the transmit buffer 212 being used according to the change in the delay time of the receive buffer 221. As described above, if the channel transfer rate changes from R1 to R2, the operating clock controller 223 gradually changes the delay time of the receive buffer 221 from $B_E$/R1 to $B_E$/R2 by progressively changing the current operating clock to the target operating clock using the Equation (2) above. Once the delay time of the receive buffer 221 has been changed due to a change in the operating clock of the receive buffer 221, the buffer controller 213 of the transmitter 210 changes the capacity of the transmit buffer 212 being used to match the current delay time of the receive buffer 221 in real time or after the operating clock in the receive buffer 221 is changed to the target operating clock.

Figure 9:
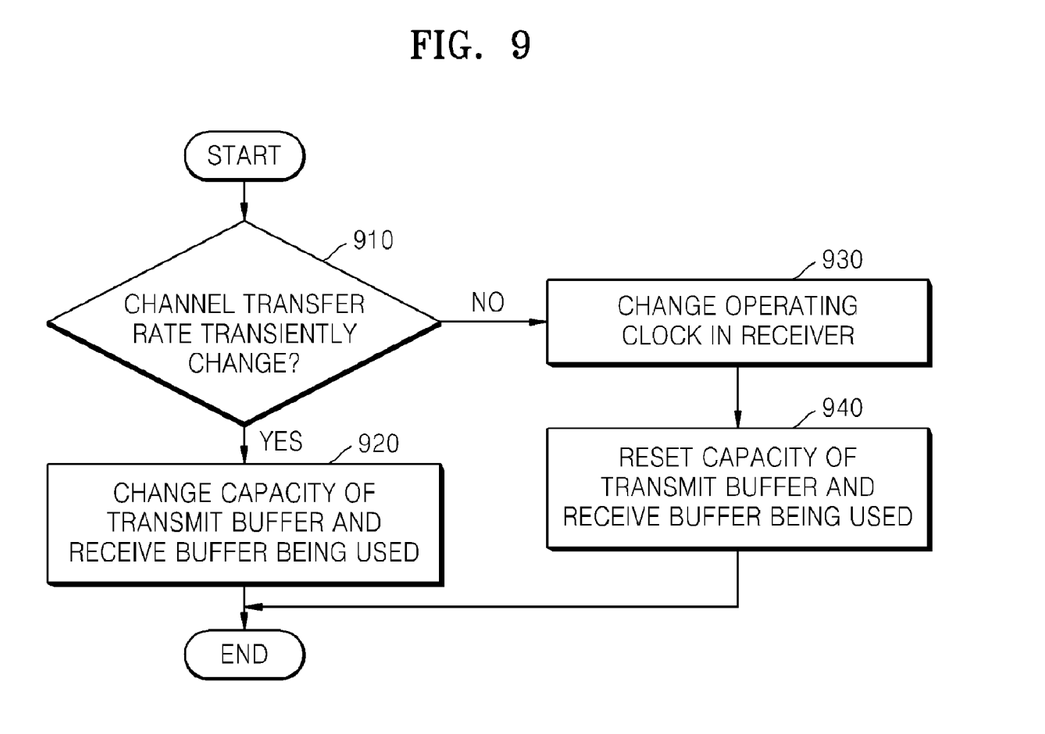
FIG. 9 is a flowchart illustrating a method for controlling a buffer in a video transmission system according to another exemplary embodiment of the present invention.

FIG. 9 is a flowchart illustrating a method for controlling a buffer in a video transmission system according to another exemplary embodiment of the present invention.

According to the method according to an exemplary embodiment, in operation 910, it is checked whether a channel transfer rate is changed either temporarily or persistently. In operation 920, if the channel transfer rate is changed temporarily, the capacities of a transmit buffer and a receive buffer being used are changed as in the method described with reference to FIG. 3 to constantly maintain the delay time of the receive buffer. Thereby, overflows of a transmitter and a receiver are prevented. If the channel transfer rate is changed persistently, in operation 930, the operating clock in the receiver is gradually changed to a target operating clock so as to eventually change the delay time of the receive buffer as in the method described with reference to FIG. 5. In operation 940, if the operating clock in the receiver is altered in accordance with the change in the channel transfer rate, the capacities of the transmit buffer to be used and receive buffer are reset so as to make full use of the given buffer capacity.

A method for controlling a buffer in a video transmission system according to exemplary embodiments of the present invention can prevent overflows and underflows of buffers when a channel transfer rate changes, thereby permitting efficient use of resources in the video transmission system.

The present invention also prevents degradation in quality of video data that may occur in a receiver due to a change in channel transfer rate and can be applied to a real-time video transmission system for transmitting video in real time.

While this invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims and their equivalents, and all differences within the scope will be construed as being included in the present invention. The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

In another exemplary embodiment, the computer readable recording medium may include carrier waves (such as data transmission through the Internet) and may also be distributed over network coupled computer systems so that the computer readable code is stored and executed in a distributed fashion.

What is claimed is:

1. A method for controlling a buffer in a receiver of a video transmission system, the method comprising:
   determining whether a channel transfer rate is changed; and
   changing, if the channel transfer rate is changed, a delay time of the buffer in the receiver by gradually changing an operating clock in the receiver,
   wherein if the channel transfer rate is increased, the changing of the delay time comprises:
      computing an optimal delay time of the buffer in the receiver for preventing overflow and underflow at the increased channel transfer rate;
      calculating a target operating clock in the receiver for generating the optimal delay time; and
      gradually increasing the operating clock in the receiver to the target operating clock, and
   wherein if the channel transfer rate is decreased, the changing of the delay time comprises:
      computing an optimal delay time of the buffer in the receiver for preventing overflow and underflow at the decreased channel transfer rate;
      calculating a target operating clock in the receiver for generating the optimal delay time; and
   gradually decreasing the operating clock in the receiver to the target operating clock.

2. The method of claim 1, wherein the delay time is a difference between a point in time at which video data is input to the buffer in the receiver and a point in time at which the data is output from the buffer in the receiver.

3. The method of claim 1, further comprising:
determining a usage capacity of a buffer in a transmitter according to a change in the operating clock in the receiver; and
changing capacity of the buffer in the transmitter according to the determined usage capacity of the buffer.

4. A receiver in a video transmission system, comprising:
a buffer which stores video data and outputs the video data;
a decoder which reproduces the output video data; and
an operating clock controller changing, if a channel transfer rate is changed, a delay time of the buffer by gradually changing an operating clock in the buffer,
wherein the operating clock controller computes, if the channel transfer rate is increased, an optimal delay time of the buffer for preventing overflow and underflow at the increased channel transfer rate as well as a target operating clock for generating the optimal delay time, and the operating clock controller gradually increases the operating clock to the target operating clock, and
the operating clock controller computes, if the channel transfer rate is decreased, an optimal delay time of the buffer for preventing overflow and underflow at the decreased channel transfer rate as well as a target operating clock for generating the optimal delay time, and the operating clock controller gradually decreases the operating clock to the target operating clock.

5. The receiver of claim 4, wherein the delay time is a difference between a point in time at which the video data is input to the buffer and a point in time at which the video data is output from the buffer.

* * * * *